United States Patent
Onaka et al.

(10) Patent No.: US 11,183,920 B2
(45) Date of Patent: Nov. 23, 2021

(54) SWITCHING POWER SUPPLY WITH DELAY FOR DEAD TIME ADJUSTMENT

(71) Applicant: FDK CORPORATION, Tokyo (JP)

(72) Inventors: Tomoki Onaka, Tokyo (JP); Miyabi Ishikawa, Tokyo (JP); Norio Fukui, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 16/764,797

(22) PCT Filed: Oct. 23, 2018

(86) PCT No.: PCT/JP2018/039253
§ 371 (c)(1),
(2) Date: May 15, 2020

(87) PCT Pub. No.: WO2019/111564
PCT Pub. Date: Jun. 13, 2019

(65) Prior Publication Data
US 2020/0358366 A1    Nov. 12, 2020

(30) Foreign Application Priority Data

Dec. 7, 2017 (JP) .............................. JP2017-235336

(51) Int. Cl.
*H02M 1/38* (2007.01)
*H02M 7/21* (2006.01)

(52) U.S. Cl.
CPC ............... *H02M 1/38* (2013.01); *H02M 7/21* (2013.01)

(58) Field of Classification Search
CPC ............ H02M 1/38; H02M 7/21; H02M 3/28; H02M 3/325; H02M 3/33592
See application file for complete search history.

(56) References Cited

U.S. PATENT DOCUMENTS

2002/0196002 A1   12/2002 Diallo et al.
2009/0168464 A1*  7/2009 Lin ................... H02M 3/33592
                                                    363/21.06
(Continued)

FOREIGN PATENT DOCUMENTS

JP   2001112241 A   4/2001
JP   2004222368 A   8/2004
(Continued)

OTHER PUBLICATIONS

International Search Report and Written Opinion dated Dec. 18, 2018, for corresponding PCT Application No. PCT/JP2018/039253.

(Continued)

*Primary Examiner* — Alex Torres-Rivera
(74) *Attorney, Agent, or Firm* — Kinney & Lange, P.A.

(57) ABSTRACT

A switching power supply includes an input terminal and an output terminal, a voltage converter including a first switching circuit configured to serve as a trigger for inputting a voltage from the input terminal and a second switching circuit configured to serve as a trigger for outputting, after the input voltage is converted, the converted voltage from the output terminal O, a control circuit configured to output a control signal for selectively sequentially driving the first switching circuit and the second switching circuit, and a delay circuit configured to delay, based on the control signal for driving any one of the first switching circuit and the second switching circuit, a subsequent driving timing of the other switching circuit that is not driven to provide a dead time when both the first switching circuit and the second switching circuit are turned off.

2 Claims, 8 Drawing Sheets

(56) References Cited

U.S. PATENT DOCUMENTS

| | | | |
|---|---|---|---|
| 2010/0156376 A1* | 6/2010 | Fu .......................... | H02M 1/38 323/283 |
| 2010/0182807 A1 | 7/2010 | Miyamoto et al. | |
| 2010/0302824 A1* | 12/2010 | Nishino .............. | H02M 1/4225 363/127 |
| 2013/0094252 A1* | 4/2013 | Sato .................. | H02M 3/33553 363/21.11 |

FOREIGN PATENT DOCUMENTS

| | | | |
|---|---|---|---|
| JP | 2008259283 A | 10/2008 |
| JP | 2011015461 A | 1/2011 |

OTHER PUBLICATIONS

Extended European Search Report dated Jul. 14, 2021, received for corresponding European Application No. 18885552.2, seven pages.

* cited by examiner

SWITCHING POWER SUPPLY WITH DELAY FOR DEAD TIME ADJUSTMENT

CROSS-REFERENCE TO RELATED APPLICATION(S)

This application is the national phase of PCT Application No. PCT/JP2018/039253 filed on Oct. 23, 2018, which in turn claims priority to Japanese Application No. 2017-235336 filed on Dec. 7, 2017, both of which are incorporated by reference herein in their entireties.

TECHNICAL FIELD

The present disclosure relates to a switching power supply that converts and outputs an input voltage.

BACKGROUND

A switching power supply includes an input terminal and an output terminal, converts a voltage input from the input terminal and outputs the converted voltage to the output terminal. In the switching power supply, a first transistor serving as a trigger for inputting the voltage from the input terminal and a second transistor serving as a trigger for outputting the voltage from the output terminal are turned on and off by an control signal output from a dedicated-use IC, so that the voltage input from the input terminal is output from the output terminal. The above-described switching power supply is configured to provide a time (dead time) when both the first transistor and the second transistor are turned off, and set a configuration where both the first transistor and the second transistor are not turned on at the same time. The dead time is fixed by the dedicated-use IC.

PRIOR ART DOCUMENT

Patent Document

Patent Document 1: Japanese Patent Laid-Open No. 2001-112241

SUMMARY

Since on and off states of a first transistor and a second transistor are controlled by a dedicated-use IC, a highly versatile IC is not to be used. In addition, since a dead time is fixed by the dedicated-use IC, there is a possibility that the first transistor and the second transistor may be turned on at the same time depending on a configuration of the circuit. When the first transistor and the second transistor are turned on at the same time, the circuit is damaged. Furthermore, since the dead time is fixed by the dedicated-use IC, an adjustment to set any dead time is not to be performed. Accordingly, since an adjustment to a dead time optimal to the circuit is not performed, efficiency of step-up and step-down in a switching power supply is not improved.

The present disclosure has been made in view of the above-described circumstances, and is aimed at providing a switching power supply that can improve efficiency of step-up and step-down while risks such as circuit damage in voltage step-up and step-down operations are reduced.

In order to achieve the above object, an aspect of the present disclosure is directed to a switching power supply including an input terminal and an output terminal, a voltage converter including a first switching circuit configured to serve as a trigger for inputting a voltage from the input terminal and a second switching circuit configured to serve as a trigger for outputting, after the input voltage is converted, the converted voltage from the output terminal, a control circuit configured to output a control signal for selectively sequentially driving the first switching circuit and the second switching circuit, and a delay circuit configured to delay, based on the control signal for driving any one of the first switching circuit and the second switching circuit, a subsequent driving timing of the other switching circuit that is not driven to provide a dead time when both the first switching circuit and the second switching circuit are turned off.

In accordance with the above-described configuration, in the switching power supply according to the aspect of the present disclosure, the dead time when both the first switching circuit and the second switching circuit are turned off is provided by the delay circuit. Accordingly, it is possible to avoid a state where the first switching circuit and the second switching circuit are turned on at the same time. In addition, the dead time is secured even when a first control signal and a second control signal are input at various timings, and it is possible to avoid a state where the first switching circuit and the second switching circuit are turned on at the same time.

The switching power supply according to the aspect of the present disclosure can improve the efficiency of the step-up and step-down while the risks such as the circuit damage in the voltage step-up and step-down operations are reduced.

BRIEF DESCRIPTION OF THE DRAWINGS

The present disclosure will become more fully understood from the detailed description given hereinafter and the accompanying drawings which are given by way of illustration only, and thus, are not limitative of the present invention, and wherein.

DETAILED DESCRIPTION

Figure 1:
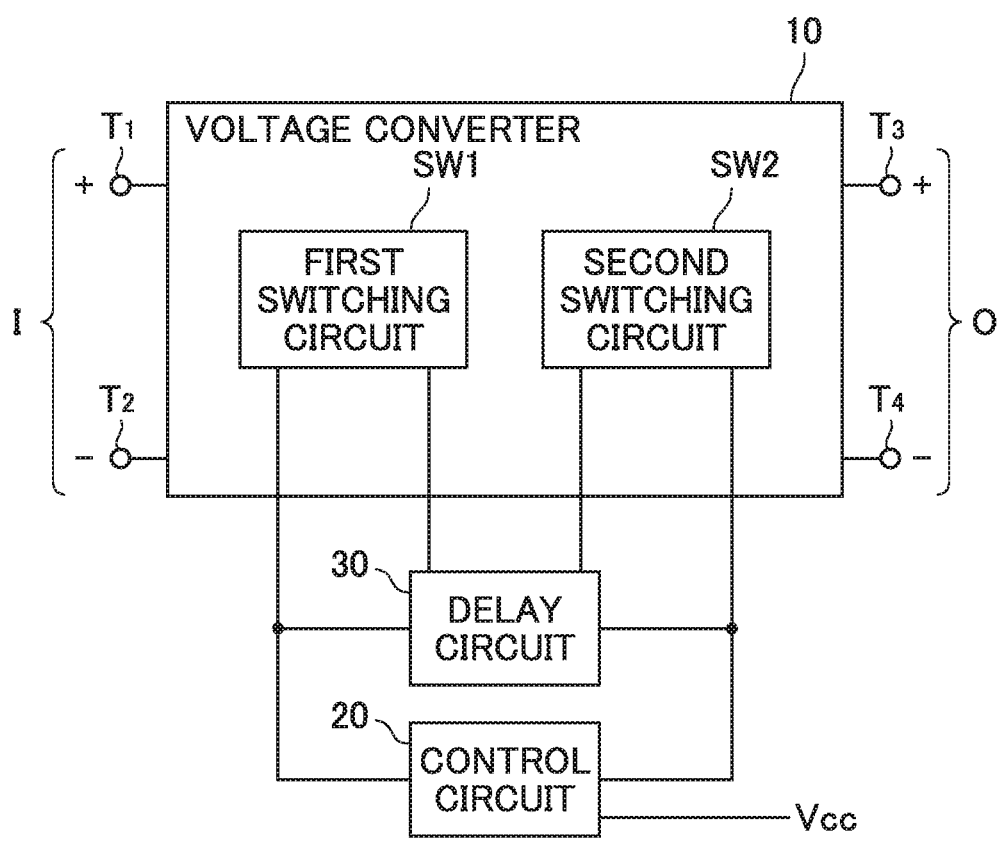
FIG. 1 is a block diagram illustrating a switching power supply according to a present embodiment.

Hereinafter, a switching power supply according to one present embodiment of the present disclosure will be described with reference to the drawings. It is noted that the present embodiment is not limited by contents which will be described below, and can be implemented by optionally making a change within a range without departing from the gist thereof. In addition, each of the drawings used for describing the embodiment schematically illustrates a component, in which partial emphasis, expansion, reduction, omission, or the like is performed to improve understanding, and in some cases, the drawing does not accurately represent a scale, a shape, or the like of the component.

FIG. 1 is a block diagram illustrating the switching power supply according to the present embodiment. The switching power supply illustrated in FIG. 1 is, for example, an apparatus that converts a voltage input from an input terminal I including a first positive terminal $T_1$ and a first negative terminal $T_2$, and outputs the converted voltage from an output terminal O including a second positive terminal $T_3$ and a second negative terminal $T_4$. The switching power supply illustrated in FIG. 1 includes a voltage converter 10, a control circuit 20, and a delay circuit 30.

The voltage converter 10 converts the voltage input from the input terminal I, and outputs the converted voltage from the output terminal O. The voltage converter 10 includes a first switching circuit SW1 serving as a trigger for inputting the voltage from the input terminal I and a second switching circuit SW2 serving as a trigger for outputting, after the input voltage is converted, the converted voltage from the output terminal O.

The control circuit 20 outputs a control signal for selectively sequentially driving the first switching circuit SW1 and the second switching circuit SW2 described above. For example, the control circuit 20 outputs a first control signal for turning on the first switching circuit SW1 and a second control signal for turning on the second switching circuit SW2. The first control signal and the second control signal which are output from the control circuit 20 are pulse signals that repeat an on-period or an off-period at a certain cycle. The control circuit 20 is, for example, a general-use IC. The control circuit 20 is connected to an external power supply Vcc.

The delay circuit 30 delays, based on control signal for driving any one of the first switching circuit SW1 and the second switching circuit SW2, a subsequent driving timing of the other switching circuit that is not driven. For example, the delay circuit 30 delays, based on the first control signal for turning on the first switching circuit SW1, the subsequent timing for turning on the second switching circuit SW2 that is not driven. In addition, the delay circuit 30 delays, based on the second control signal for turning on the second switching circuit SW2, the subsequent timing for turning on the first switching circuit SW1 that is not driven. Accordingly, the delay circuit 30 provides a dead time when both the first switching circuit SW1 and the second switching circuit SW2 are turned off in a process for selectively sequentially driving the first switching circuit and the second switching circuit SW2.

Figure 2:
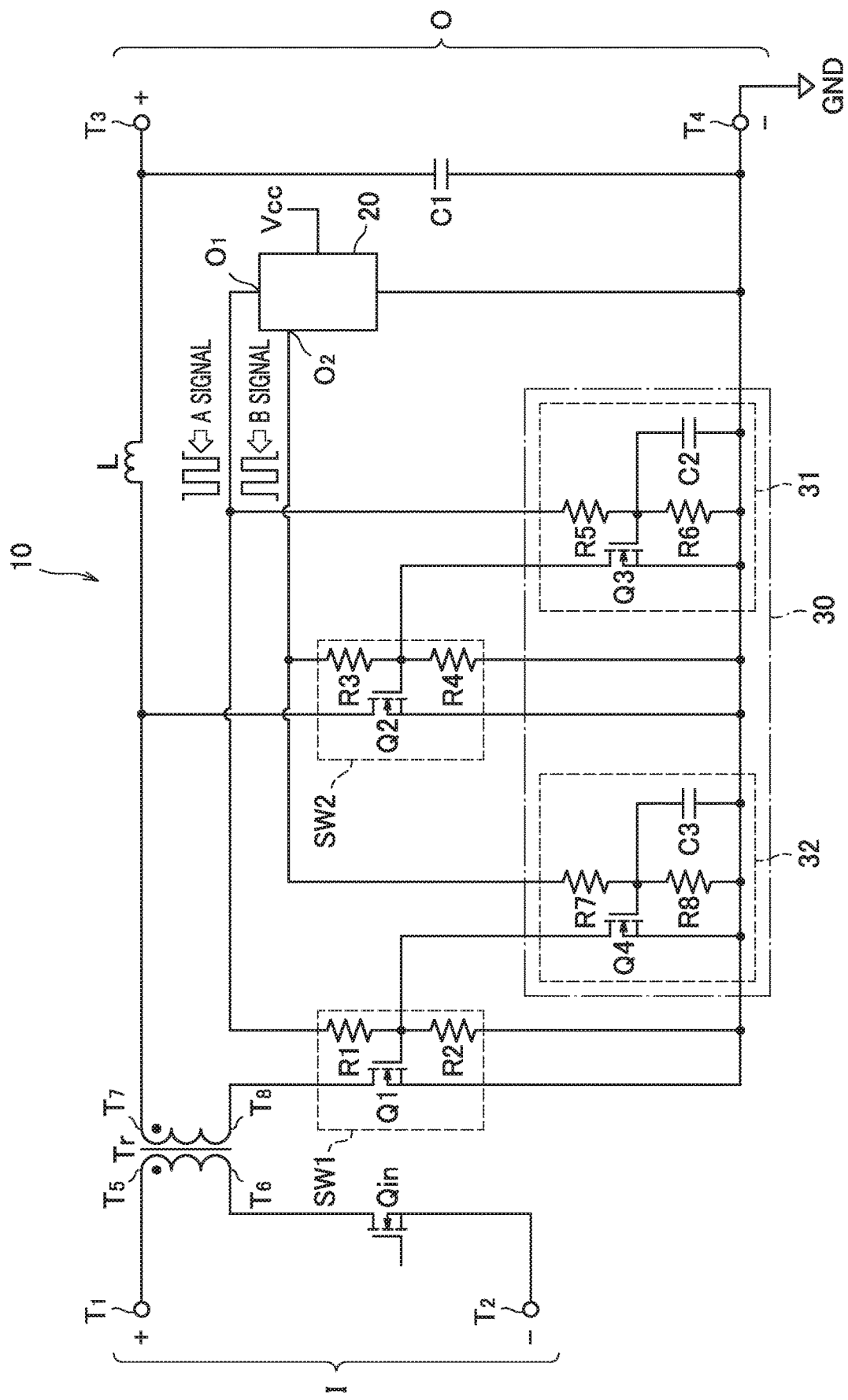
FIG. 2 is a circuit diagram illustrating an example of the switching power supply illustrated in FIG. 1.

Furthermore, a detailed circuit configuration of each unit illustrated in FIG. 1 will be described with reference to FIG. 2. FIG. 2 is a circuit diagram illustrating an example of the switching power supply illustrated in FIG. 1. Herein, the voltage converter 10 illustrated in FIG. 2 includes a transformer Tr. As illustrated in FIG. 2, the first positive terminal $T_1$ is connected to one terminal $T_5$ of a primary winding of the transformer. The first negative terminal $T_2$ is connected to the other terminal $T_6$ of the primary winding of the transformer Tr. The second positive terminal $T_3$ to one terminal $T_7$ of a secondary winding of the transformer. The second negative terminal $T_4$ is connected to the other terminal $T_8$ of the secondary winding of the transformer Tr. The second negative terminal $T_4$ is connected to the ground GND (Ground fault).

The voltage converter 10 illustrated in FIG. 2 also includes a coil L and a first capacitance C1. The coil L is connected between the one terminal $T_7$ of the secondary winding of the transformer Tr and the second positive terminal $T_3$. One terminal of the first capacitance C1 is connected between the other terminal of the coil L on the positive terminal side and the second positive terminal $T_3$. In addition, the other terminal of the first capacitance C1 is connected to the second negative terminal $T_4$. In other words, the other terminal of the first capacitance C1 is connected to the ground GND. That is, the voltage converter 10 illustrated in FIG. 2 is an insulation type step-down converter in which the transformer Tr is provided between the input terminal I and the output terminal O, and the voltage input from the input terminal I is stepped-down to be output from the output terminal O. Hereinafter, in the embodiment, for convenience of the descriptions, a case of the connection to the second negative terminal $T_4$ will be described as being connected to the ground GND.

In addition, the input of the voltage to the primary winding side of the transformer Tr is managed by an input side switching circuit Qin. A gate of the input side switching circuit Qin is connected to the switching power supply that is not illustrated in the drawing.

The first switching circuit SW1 is connected between the other terminal $T_8$ of the secondary winding of the transformer Tr and the second negative terminal $T_4$. Driving of the first switching circuit SW1 is synchronized with driving of the input side switching circuit Qin. For example, in a case where the input side switching circuit Qin is turned on, the first switching circuit SW1 is turned on. One terminal of the second switching circuit SW2 is connected between the one terminal $T_7$ of the secondary winding of the transformer Tr and one terminal of the coil L on the first positive terminal side. In addition, the other terminal of the second switching circuit SW2 is connected to the ground GND.

Herein, a circuit configuration of the first switching circuit SW1 and the second switching circuit SW2 will be described in detail. The first switching circuit SW1 includes a first resistor R1, a second resistor R2, and a first switching element Q1. One terminal of the first resistor R1 is connected to a first signal output terminal $O_1$ configured to output the first control signal (A signal illustrated in FIG. 2) in the control circuit 20. The second resistor R2 is connected in parallel to the first resistor R1. That is, one terminal of the second resistor R2 is connected to the other terminal of the first resistor R1. In addition, the other terminal of the second resistor R2 is connected to the ground GND. The first switching element Q1 is, for example, an n-channel MOSFET. A gate of the first switching element Q1 is connected between the first resistor R1 and the second resistor R2. In addition, a drain of the first switching element Q1 is connected to the other terminal $T_8$ of the secondary winding of the transformer Tr. In addition, a source of the first switching element Q1 is connected to the ground GND.

The second switching circuit SW2 includes a third resistor R3, a fourth resistor R4, and a second switching element Q2. One terminal of the third resistor R3 is connected to a second signal output terminal $O_2$ configured to output the second control signal (B signal illustrated in FIG. 2) in the control circuit 20. The fourth resistor R4 is connected in series to the third resistor R3. That is, one terminal of the fourth resistor R4 is connected to the other terminal of the third resistor R3. In addition, the other terminal of the fourth resistor R4 is connected to the ground GND. The second switching element Q2 is, for example, an n-channel MOS-FET. A gate of the second switching element Q2 is connected between the third resistor R3 and the fourth resistor R4. In addition, a drain of the second switching element Q2 is connected between the one terminal $T_7$ of the secondary winding of the transformer Tr and one terminal of the coil L on the first positive terminal side. In addition, a source of the second switching element Q2 is connected to the ground GND.

The delay circuit 30 includes a first delay circuit 31 and a second delay circuit 32. The first delay circuit 31 delays, based on the first control signal for turning on the first switching circuit SW1, a subsequent timing for turning on the second switching circuit SW2 that is not driven. The first delay circuit 31 includes a fifth resistor R5, a sixth resistor R6, and a third switching element Q3. One terminal of the fifth resistor R5 is connected between the first signal output terminal $O_1$ the first resistor R1. The sixth resistor R6 is connected in series to the fifth resistor R5. That is, one terminal of the sixth resistor R6 is connected to the other terminal of the fifth resistor R5. In addition, the other terminal of the sixth resistor R6 is connected to the ground GND. A second capacitance C2 is connected in parallel to the sixth resistor R6. That is, one terminal of the second capacitance C2 is connected between the fifth resistor R5 and the sixth resistor R6 and also connected to a gate of the third switching element Q3. In addition, the other terminal of the second capacitance C2 is connected to the ground GND. The gate of the third switching element Q3 is connected between the fifth resistor R5 and the sixth resistor R6. In addition, a drain of the third switching element Q3 is connected between the third resistor R3 and the fourth resistor R4 and also connected to the gate of the second switching element Q2. In addition, a source of the third switching element Q3 is connected to the ground GND.

The second delay circuit 32 delays, based on the second control signal for turning on the second switching circuit SW2, a subsequent timing for turning on the first switching circuit SW1 that is not driven. The second delay circuit 32 includes a seventh resistor R7, an eighth resistor R8, and a fourth switching element Q4. One terminal of the seventh resistor R7 is connected to the second signal output terminal $O_2$. The eighth resistor R8 is connected in series to the seventh resistor R7. That is, one terminal of the eighth resistor R8 is connected to the other terminal of the seventh resistor R7. The other terminal of the eighth resistor R8 is connected to the ground GND. A third capacitance C3 is connected in parallel to the eighth resistor R8. That is, the one terminal of the eighth resistor R8 is connected between the seventh resistor R7 and the eighth resistor R8 and also connected to a gate of the fourth switching element Q4. In addition, the other terminal of the eighth resistor R8 is connected to the ground GND. The gate of the fourth switching element Q4 is connected between the seventh resistor R7 and the eighth resistor R8. In addition, a drain of the fourth switching element Q4 is connected between the first resistor R1 and the first resistor R1 and also connected to the gate of the first switching element Q1. In addition, a source of the fourth switching element Q4 is connected to the ground GND.

Herein, states of respective elements along with on and off of the first switching circuit SW1 and the second switching circuit SW2 in the present embodiment will be described with reference to a timing chart related to on and off of the first switching circuit SW1 and the second switching circuit SW2. It is noted that, in the present embodiment, a case where the first control signal and the second control signal are alternately input, a case where the first control signal and the second control signal are discretely input, and a case where the first control signal and the second control signal are input while being overlapped with each other will be separately described. In addition, in the following embodiment, redundant descriptions are omitted where appropriate.

(Case where the First Control Signal and the Second Control Signal are Alternately Input)

Figure 3:
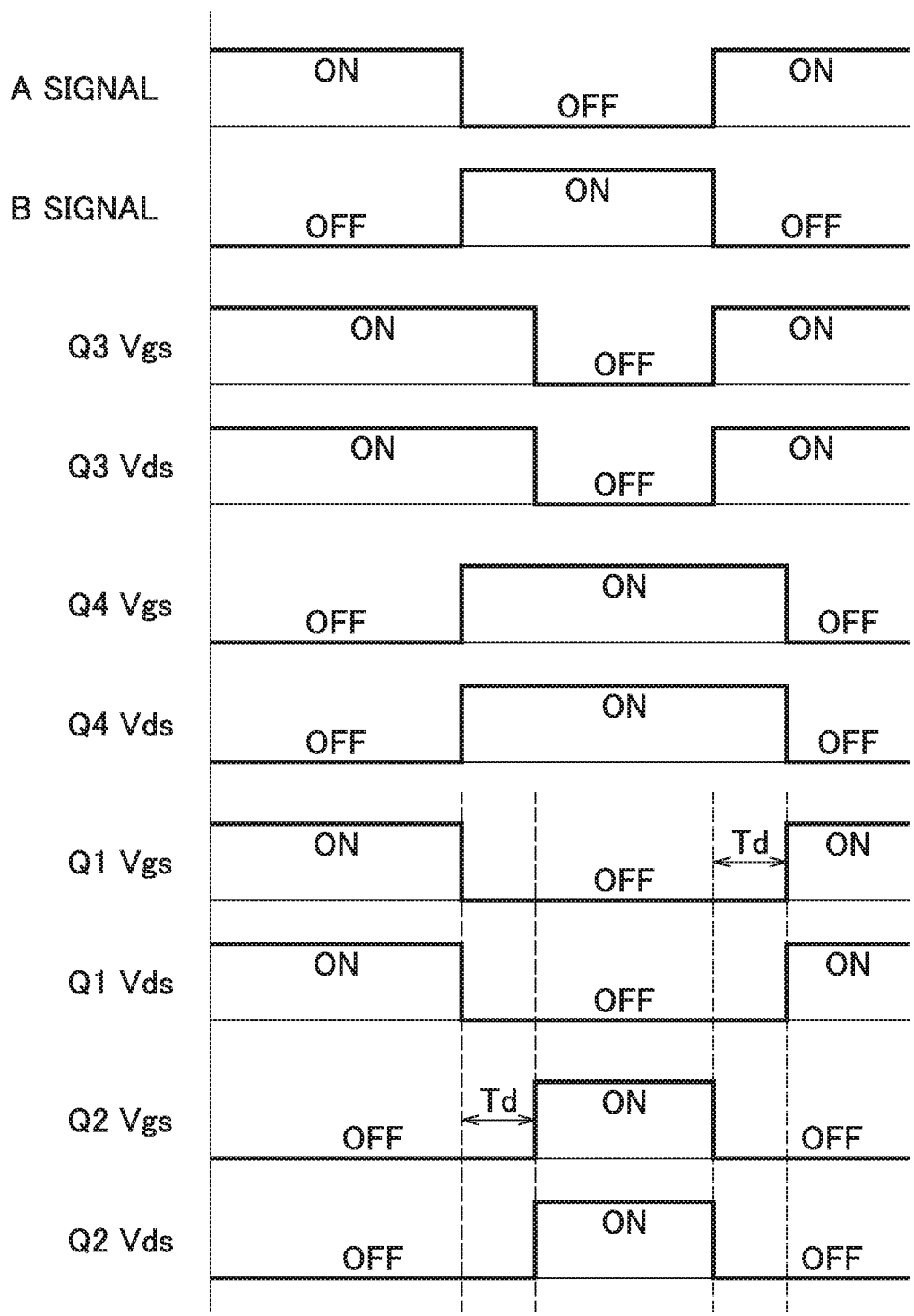
FIG. 3 is a timing chart in a case where a first control signal and a second control signal are alternately input to a first switching circuit and a second switching circuit.

FIG. 3 is a timing chart in a case where the first control signal and the second control signal are alternately input to the first switching circuit SW1 and the second switching circuit SW2. The timing chart illustrated in FIG. 3 indicates a gate-source voltage Vgs and a drain-source voltage Vds in the third switching element Q3, a gate-source voltage Vgs and a drain-source voltage Vds in the fourth switching element Q4, a gate-source voltage Vgs and a drain-source voltage Vds in the first switching element Q1, and a gate-source voltage Vgs and a drain-source voltage Vds in the second switching element Q2 in a case where the first control signal for turning on the first switching circuit SW1 (A signal illustrated in FIG. 3) and the second control signal for turning on the second switching circuit SW2 (B signal illustrated in FIG. 3) are alternately input by the control circuit 20. That is, FIG. 3 illustrates the states of the respective elements included in the switching power supply in a case where the A signal and the B signal described above are alternately input.

(Period from when the a Signal is Turned on to a Moment Immediately Before the A Signal is Turned Off (First Period))

First, in a period from when the A signal illustrated in FIG. 3 is turned on to a moment immediately before the A signal is turned off, the A signal that has passed through the first resistor R1 is input to the gate of the first switching element Q1. Accordingly, the gate-source voltage Vgs in the first switching element Q1 is turned on. In addition, the drain-source voltage Vds in the first switching element Q1 is turned on. That is, the first switching element Q1 is turned on.

In addition, the A signal that has passed through the fifth resistor R5 is input to the second capacitance C2. Accordingly, the second capacitance C2 accumulates charges. On the other hand, the A signal that has passed through the fifth resistor R5 is also input to the gate of the third switching element Q3. Accordingly, the gate-source voltage Vgs in the third switching element Q3 is turned on. In addition, the drain-source voltage Vds in the third switching element Q3 is turned on. That is, the third switching element Q3 is turned on.

(Period from when the A Signal is Turned Off to a Moment Immediately Before the B Signal is Turned On (Second Period))

Next, in a period from when the A signal is turned off to a moment immediately before the B signal is turned on, the A signal is not input to the gate of the first switching element Q1. Accordingly, the gate-source voltage Vgs in the first switching element Q1 is turned off. In addition, the drain-source voltage Vds in the first switching element Q1 is turned off. That is, the first switching element Q1 is turned off.

In addition, the A signal is not input to the second capacitance C2. The second capacitance C2 supplies the accumulated charges to the gate of the third switching element Q3. Herein, a part of the charges output from the second capacitance C2 is also supplied to the gate of the first switching element Q1 via a supply path of the A signal. However, since the fifth resistor R5 and the first resistor R1 exist in the supply path, the voltage is decreased. Accordingly, even when the part of the charges is input to the gate of the first switching element Q1, a gate threshold voltage of the first switching element Q1 does not increase to a predetermined value. That is, the first switching element Q1 is not turned on.

In addition, the A signal is not input to the gate of the third switching element Q3. Accordingly, the gate-source voltage Vgs in the third switching element Q3 is turned off. In addition, the drain-source voltage Vds in the third switching element Q3 is turned off. That is, the third switching element Q3 is turned off. At this time, the third switching element Q3 is turned off later than the first switching element Q1. A reason for this is because the charges are supplied to the gate of the third switching element Q3 from the second capacitance C2. When the charges are supplied from the second capacitance C2, a voltage exceeding a gate threshold voltage of the third switching element Q3 is applied for a predetermined time. Herein, the predetermined time can be obtained from a pulse width of the B signal supplied to the second capacitance C2 and a time constant calculated from the fifth resistor R5, the sixth resistor R6, and the second capacitance C2. In the present embodiment, the timing at which the third switching element Q3 is turned off is delayed by a predetermined time calculated from the pulse width of the B signal supplied to the second capacitance C2, and the fifth resistor R5, the sixth resistor R6, and the second capacitance C2. After the elapse of the certain time, the third switching element Q3 is turned off.

(Period from when the B Signal is Turned on to a Moment Immediately Before the B Signal is Turned Off (Third Period))

Next, in a period from when the B signal is turned on to a moment immediately before the B signal is turned off, the B signal that has passed through the third resistor R3 is input to the gate of the second switching element Q2. At this time, the second switching element Q2 remains off. A reason for this is because the third switching element Q3 is turned off later than the first switching element Q1. First, since the charges are supplied from the second capacitance C2, the third switching element Q3 remains on. In other words, since continuity is provided between the drain and the source of the third switching element Q3, a part of the B signal that has passed through the third resistor R3 flows between the drain and the source of the third switching element Q3. Accordingly, even when the B signal is input to the gate of the second switching element Q2, a gate threshold voltage of the second switching element Q2 does not increase to a predetermined value. That is, since the third switching element Q3 is turned off later than the first switching element Q1, it is possible to delay the timing for turning on the second switching element Q2. As a result, it is possible to secure the time (dead time) Td when both the first switching element Q1 and the second switching element Q2 are turned off.

After the elapse of the certain time, the third switching element Q3 is turned off, and then the gate-source voltage Vgs in the second switching element Q2 is turned on. In addition, the drain-source voltage Vds in the second switching element Q2 is turned on. That is, the second switching element Q2 is turned on.

In addition, the B signal that has passed through the seventh resistor R7 is input to the third capacitance C3. Accordingly, the third capacitance C3 accumulates charges. On the other hand, the B signal that has passed through the seventh resistor R7 is also input to the gate of the fourth switching element Q4. Accordingly, the gate-source voltage Vgs in the fourth switching element Q4 is turned on. In addition, the drain-source voltage Vds in the fourth switching element Q4 is turned on. That is, the fourth switching element Q4 is turned on.

(Period from when the B Signal is Turned Off to a Moment Immediately Before the A Signal is Turned on (Fourth Period))

Next, in a period from when the B signal is turned off to a moment immediately before the A signal is turned on, the B signal is not input to the gate of the second switching element Q2. Accordingly, the gate-source voltage Vgs in the second switching element Q2 is turned off. In addition, the drain-source voltage Vds in the second switching element Q2 is turned off. That is, the second switching element Q2 is turned off.

In addition, the B signal is not input to the third capacitance C3. The third capacitance C3 supplies the accumulated charges to the gate of the fourth switching element Q4. Herein, a part of the charges output from the third capacitance C3 is also supplied to the gate of the second switching element Q2 via the supply path of the B signal. However, since the seventh resistor R7 and the third resistor R3 exist in the supply path, the voltage is decreased. Accordingly, even when the part of the charges is input to the gate of the second switching element Q2, the gate threshold voltage of the second switching element Q2 does not increase to the predetermined value. That is, the second switching element Q2 is not turned on.

In addition, the B signal is not input to the gate of the fourth switching element Q4. Accordingly, the gate-source voltage Vgs in the fourth switching element Q4 is turned off. In addition, the drain-source voltage Vds in the fourth switching element Q4 is turned off. That is, the fourth switching element Q4 is turned off. At this time, the fourth switching element Q4 is turned off later than the second switching element Q2. A reason for this is because the charges are supplied to the gate of the fourth switching element Q4 from the third capacitance C3. When the charges are supplied from the third capacitance C3, a voltage exceeding a gate threshold voltage of the fourth switching element Q4 is applied for a predetermined time. Herein, the predetermined time can be obtained from a pulse width of the A signal supplied to the third capacitance C3 and a time constant calculated from the seventh resistor R7, the eighth resistor R8, and the third capacitance C3. In the present embodiment, the timing at which the fourth switching element Q4 is turned off is delayed by a predetermined time calculated from the pulse width of the A signal supplied to the third capacitance C3, and the seventh resistor R7, the eighth resistor R8, and the third capacitance C3. After the elapse of the certain time, the fourth switching element Q4 is turned off.

(Period from when the A Signal is Turned on to a Moment Immediately Before the A Signal is Turned Off (Fifth Period))

Next, in a period from when the A signal is turned on to a moment immediately before the A signal is turned off, the A signal that has passed through the first resistor R1 is input to the gate of the first switching element Q1. At this time, the first switching element Q1 remains off. A reason for this is because the fourth switching element Q4 is turned off later than the second switching element Q2. First, since the charges are supplied from the third capacitance C3, the fourth switching element Q4 remains on. In other words, since continuity is provided between the drain and the source of the fourth switching element Q4, a part of the A signal that has passed through the first resistor R1 flows between the drain and the source of the fourth switching element Q4. Accordingly, even when the A signal is input to the gate of the first switching element Q1, the gate threshold voltage of the first switching element Q1 does not increase to the predetermined value. That is, since the fourth switching element Q4 is turned off later than the second switching element Q2, it is possible to delay the timing for turning on the first switching element Q1. As a result, it is possible to secure the time (dead time) Td when both the first switching element Q1 and the second switching element Q2 are turned off.

After the elapse of the certain time, the fourth switching element Q4 is turned off, and then the gate-source voltage Vgs in the first switching element Q1 is turned on. In addition, the drain-source voltage Vds in the first switching element Q1 is turned on. That is, the first switching element Q1 is turned on.

In addition, the A signal that has passed through the fifth resistor R5 is input to the second capacitance C2. Accordingly, the second capacitance C2 accumulates charges. On the other hand, the A signal that has passed through the fifth resistor R5 is also input to the gate of the third switching element Q3. Accordingly, the gate-source voltage Vgs in the third switching element Q3 is turned on. In addition, the drain-source voltage Vds in the third switching element Q3 is turned on. That is, the third switching element Q3 is turned on.

Thereafter, in a case where the first control signal and the second control signal are alternately input, until the supply of the A signal and the B signal from the control circuit 20 is ended, the operations in the above-described second period to the fifth period are repeated.

(Case where the First Control Signal and the Second Control Signal are Discretely Input)

Figure 4:
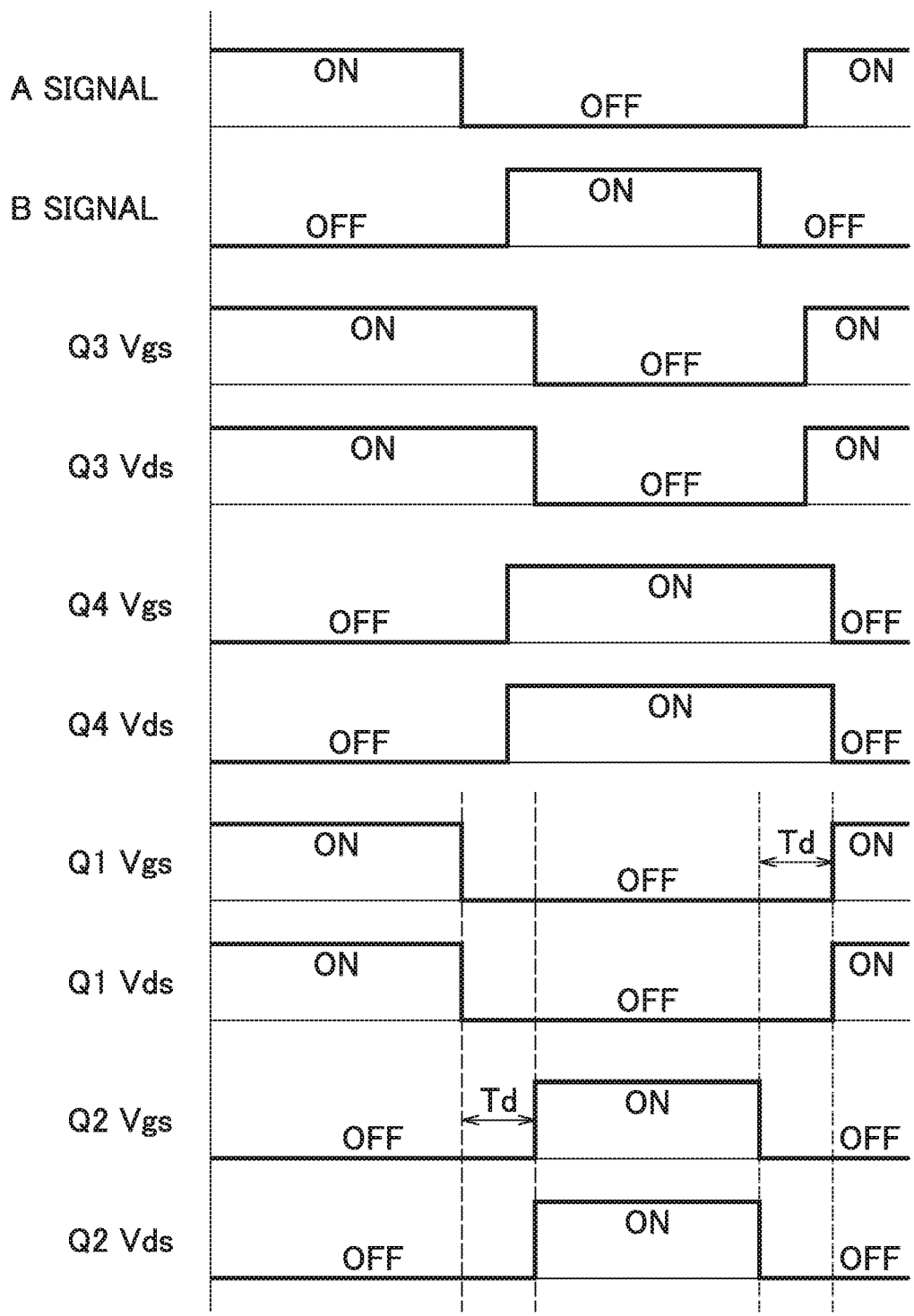
FIG. 4 is a timing chart in a case where the first control signal and the second control signal are discretely input to the first switching circuit and the second switching circuit.

FIG. 4 is a timing chart in a case where the first control signal and the second control signal are discretely input to the first switching circuit SW1 and the second switching circuit SW2. The timing chart illustrated in FIG. 4 indicates the gate-source voltage Vgs and the drain-source voltage Vds in the third switching element Q3, the gate-source voltage Vgs and the drain-source voltage Vds in the fourth switching element Q4, the gate-source voltage Vgs and the drain-source voltage Vds in the first switching element Q1, and the gate-source voltage Vgs and the drain-source voltage Vds in the second switching element Q2 in a case where the first control signal for turning on the first switching circuit SW1 (A signal illustrated in FIG. 4) and the second control signal for turning on the second switching circuit SW2 (B signal illustrated in FIG. 4) are discretely input by the control circuit 20. That is, FIG. 4 illustrates the states of the respective elements included in the switching power supply in a case where the A signal and the B signal described above are discretely input.

(Period from when the A Signal is Turned on to a Moment Immediately Before the A Signal is Turned Off (First Period))

First, in a period from when the A signal illustrated in FIG. 4 is turned on to a moment immediately before the A signal is turned off, the first switching element Q1 is turned on. In addition, the second capacitance C2 accumulates charges. In addition, the third switching element Q3 is turned on.

(Period from when the A signal is turned off to a moment immediately before the B signal is turned on (second period))

Next, in a period from when the A signal is turned off to a moment immediately before the B signal is turned on, the first switching element Q1 is turned off. In addition, the second capacitance C2 supplies the accumulated charges to the gate of the third switching element Q3. In addition, the third switching element Q3 is turned off later than the first switching element Q1. A reason for this is because the charges are supplied to the gate of the third switching element Q3 from the second capacitance C2. After the elapse of the certain time, the third switching element Q3 is turned off.

(Period from when the B Signal is Turned on to a Moment Immediately Before the B Signal is Turned Off (Third Period))

Next, in a period from when the B signal is turned on to a moment immediately before the B signal is turned off, the second switching element Q2 remains off. A reason for this is because the third switching element Q3 is turned off later than the first switching element Q1. That is, since the third switching element Q3 is turned off later than the first switching element Q1, it is possible to delay the timing for turning on the second switching element Q2. As a result, it is possible to secure the time (dead time) Td when both the first switching element Q1 and the second switching element Q2 are turned off.

After the elapse of the certain time, the third switching element Q3 is turned off, and then the second switching element Q2 is turned on. In addition, the third capacitance C3 accumulates charges. In addition, the fourth switching element Q4 is turned on.

(Period from when the B Signal is Turned Off to a Moment Immediately Before the A Signal is Turned On (Fourth Period))

Next, in a period from when the B signal is turned off to a moment immediately before the A signal is turned on, the second switching element Q2 is turned off. In addition, the third capacitance C3 supplies the accumulated charges to the gate of the fourth switching element Q4. In addition, the fourth switching element Q4 is turned off later than the second switching element Q2. A reason for this is because the charges are supplied to the gate of the fourth switching element Q4 from the third capacitance C3. After the elapse of the certain time, the fourth switching element Q4 is turned off.

(Period from when the A Signal is Turned on to a Moment Immediately Before the A Signal is Turned Off (Fifth Period))

Next, in a period from when the A signal is turned on to a moment immediately before the A signal is turned off, the first switching element Q1 remains off. A reason for this is because the fourth switching element Q4 is turned off later than the second switching element Q2. That is, since the fourth switching element Q4 is turned off later than the second switching element Q2, it is possible to delay the timing for turning on the first switching element Q1. As a result, it is possible to secure the time (dead time) Td when both the first switching element Q1 and the second switching element Q2 are turned off.

After the elapse of the certain time, the fourth switching element Q4 is turned off, and then the first switching element Q1 is turned on. In addition, the second capacitance C2 accumulates charges. In addition, the third switching element Q3 is turned on.

Thereafter, in a case where the first control signal and the second control signal are discretely input, until the supply of the A signal and the B signal from the control circuit 20 is ended, the operations in the above-described second period to the fifth period are repeated.

(Case where the First Control Signal and the Second Control Signal are Input While Being Overlapped with Each Other)

Figure 5:
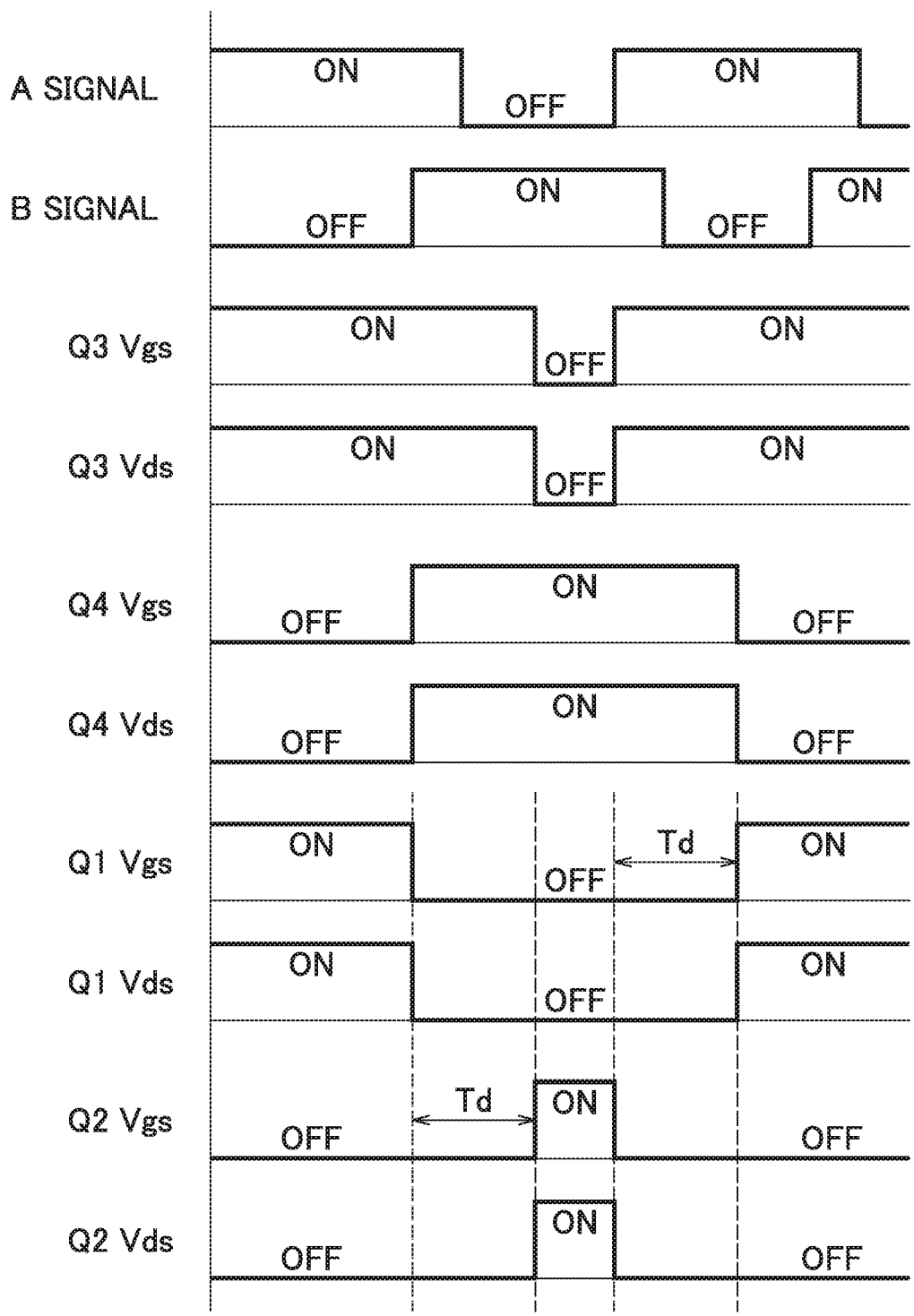
FIG. 5 is a timing chart in a case where the first control signal and the second control signal are input while being overlapped with each other to the first switching circuit and the second switching circuit.

FIG. 5 is a timing chart in a case where the first control signal and the second control signal are input to the first switching circuit SW1 and the second switching circuit SW2 while being overlapped with each other. The timing chart illustrated in FIG. 5 indicates the gate-source voltage Vgs and the drain-source voltage Vds in the third switching element Q3, the gate-source voltage Vgs and the drain-source voltage Vds in the fourth switching element Q4, the gate-source voltage Vgs and the drain-source voltage Vds in the first switching element Q1, and the gate-source voltage Vgs and the drain-source voltage Vds in the second switching element Q2 in a case where the first control signal for turning on the first switching circuit SW1 (A signal illustrated in FIG. 5) and the second control signal for turning on the second switching circuit SW2 (B signal illustrated in FIG. 5) are input by the control circuit 20 while being overlapped with each other due to factors such as a circuit design of the control circuit 20 and erroneous operations of apparatuses. That is, FIG. 5 illustrates the states of the respective elements included in the switching power supply in a case where the A signal and the B signal described above are input while being overlapped with each other.

(Period from when the A Signal is Turned on to a Moment Immediately Before the B Signal is Turned On (First Period))

First, in a period from when the A signal illustrated in FIG. 5 is turned on to a moment immediately before the B signal is turned on, the first switching element Q1 is turned on. In addition, the second capacitance C2 accumulates charges. In addition, the third switching element Q3 is turned on.

(Period from when the B signal is Turned on to a Moment Immediately Before the A Signal is Turned Off (Second Period))

Next, in a period from when the B signal is turned on to a moment immediately before the A signal is turned off, the third switching element Q3 is turned on. In addition, the fourth switching element Q4 is turned on. A reason for this is because both the A signal and the B signal are turned on. On the other hand, since the fourth switching element Q4 is on, even when the A signal is input to the gate of the first switching element Q1, a part of the A signal flows into the fourth switching element Q4. Accordingly, the gate threshold voltage of the first switching element Q1 does not increase to the predetermined value. That is, the first switching element Q1 is turned off. In addition, since the third switching element Q3 is on, even when the B signal is input to the gate of the second switching element Q2, a part of the B signal flows into the third switching element Q3. Accordingly, the gate threshold voltage of the second switching element Q2 does not increase to the predetermined value. That is, the second switching element Q2 is turned off.

(Period from when the A Signal is Turned Off to a Moment Immediately Before the A Signal is Turned On (Third Period))

Next, in a period from when the A signal is turned off to a moment immediately before the A signal is turned on, the first switching element Q1 is turned off. In addition, the second capacitance C2 supplies the accumulated charges to the gate of the third switching element Q3. In addition, the third switching element Q3 is turned off later than the first switching element Q1. A reason for this is because the charges are supplied to the gate of the third switching element Q3 from the second capacitance C2. After the elapse of the certain time, the third switching element Q3 is turned off.

In addition, the second switching element Q2 remains off. A reason for this is because the third switching element Q3 is turned off later than the first switching element Q1. That is, since the third switching element Q3 is turned off later than the first switching element Q1, it is possible to delay the timing for turning on the second switching element Q2. As a result, it is possible to secure the time (dead time) Td when both the first switching element Q1 and the second switching element Q2 are turned off.

After the elapse of the certain time, the third switching element Q3 is turned off, and then the second switching element Q2 is turned on. In addition, the third capacitance C3 accumulates charges. In addition, the fourth switching element Q4 is turned on.

(Period from when the A Signal is Turned on to a Moment Immediately Before the B Signal is Turned Off (Fourth Period))

Next, similarly as in a period from when the A signal is turned on to a moment immediately before the B signal is turned off, the third switching element Q3 is turned on. In addition, the fourth switching element Q4 is turned on. Since the third switching element Q3 and the fourth switching element Q4 are on, the first switching element Q1 and the second switching element Q2 are turned off.

(Period from when the B Signal is Turned Off to a Moment Immediately Before the B Signal is Turned On (Fifth Period))

Next, in a period from when the B signal is turned off to a moment immediately before the B signal is turned on, the second switching element Q2 is turned off. In addition, the third capacitance C3 supplies the accumulated charges to the gate of the fourth switching element Q4. In addition, the fourth switching element Q4 is turned off later than the second switching element Q2. A reason for this is because the charges are supplied to the gate of the fourth switching element Q4 from the third capacitance C3. After the elapse of the certain time, the fourth switching element Q4 is turned off.

In addition, the first switching element Q1 remains off. A reason for this is because the fourth switching element Q4 is turned off later than the second switching element Q2. That is, since the fourth switching element Q4 is turned off later than the second switching element Q2, it is possible to delay the timing for turning on the first switching element Q1. As a result, it is possible to secure the time (dead time) Td when both the first switching element Q1 and the second switching element Q2 are turned off.

After the elapse of the certain time, the fourth switching element Q4 is turned off, and then the first switching element Q1 is turned on. In addition, the second capacitance C2 accumulates charges. In addition, the third switching element Q3 is turned on.

(Period from when the B Signal is Turned on to a Moment Immediately Before the A Signal is Turned Off (Sixth Period))

Next, in a period from when the B signal is turned on to a moment immediately before the A signal is turned off, the first switching element Q1 is turned on. In addition, the second capacitance C2 accumulates charges. In addition, the fourth switching element Q4 is turned on. In addition, the third switching element Q3 is turned on. In addition, the second capacitance C2 accumulates charges.

In addition, the second switching element Q2 remains off. A reason for this is because the third switching element Q3 is turned on. That is, the second switching element Q2 is turned off.

(Period from when the A Signal is Turned Off to a Moment Immediately Before the A Signal is Turned On (Seventh Period))

Next, in a period from when the A signal is turned off to a moment immediately before the A signal is turned on, the first switching element Q1 is turned off. In addition, the second capacitance C2 supplies the accumulated charges to the gate of the third switching element Q3. In addition, the third switching element Q3 is turned off later than the first switching element Q1. A reason for this is because the charges are supplied to the gate of the third switching element Q3 from the second capacitance C2. After the elapse of the certain time, the third switching element Q3 is turned off.

In addition, the second switching element Q2 remains off. A reason for this is because the third switching element Q3 is turned off later than the first switching element Q1. That is, since the fourth switching element Q4 is turned off later than the second switching element Q2, it is possible to delay the timing for turning on the first switching element Q1. As a result, it is possible to secure the time (dead time) Td when both the first switching element Q1 and the second switching element Q2 are turned off.

After the elapse of the certain time, the third switching element Q3 is turned off, and then the second switching element Q2 is turned on. In addition, the third capacitance C3 accumulates charges. In addition, the fourth switching element Q4 is turned on.

Thereafter, in a case where the first control signal and the second control signal are input while being overlapped with each other, until the supply of the A signal and the B signal from the control circuit 20 is ended, the operations in the above-described second period to the seventh period are repeated.

In accordance with the above-described configuration, the switching power supply according to the present embodiment provides the dead time when both the first switching element Q1 and the second switching element Q2 are turned off, by the first delay circuit 31 and the second delay circuit 32. Accordingly, it is possible to avoid the state where the first switching element Q1 and the second switching element Q2 are turned on at the same time. In addition, as described above, the dead time is secured even when the first control signal and the second control signal are input at various timings, and it is possible to avoid the state where the first switching element Q1 and the second switching element Q2 are turned on at the same time.

In addition, by adjusting the values of the fifth resistor R5, the sixth resistor R6, and the second capacitance C2 which are included in the first delay circuit 31 and the seventh resistor R7, the eighth resistor R8, and the third capacitance C3 which are included in the second delay circuit 32, it is possible to adjust the dead time to the optimal time appropriate to the circuit. Accordingly, the switching power supply according to the present embodiment can improve efficiency of step-up and step-down. In addition, even when a dedicated-use IC is not used, an operation similar to the dedicated-use IC can be performed by a general-use IC.

MODIFIED EXAMPLE

In the switching power supply according to the above-described embodiment, a configuration including the first delay circuit 31 and the second delay circuit 32 is illustrated as an example. However, the switching power supply according to the present embodiment is not limited to this. For example, the switching power supply according to the present embodiment may also adopt a configuration where turning-on of only one of the switching circuits can be delayed.

Figure 6:
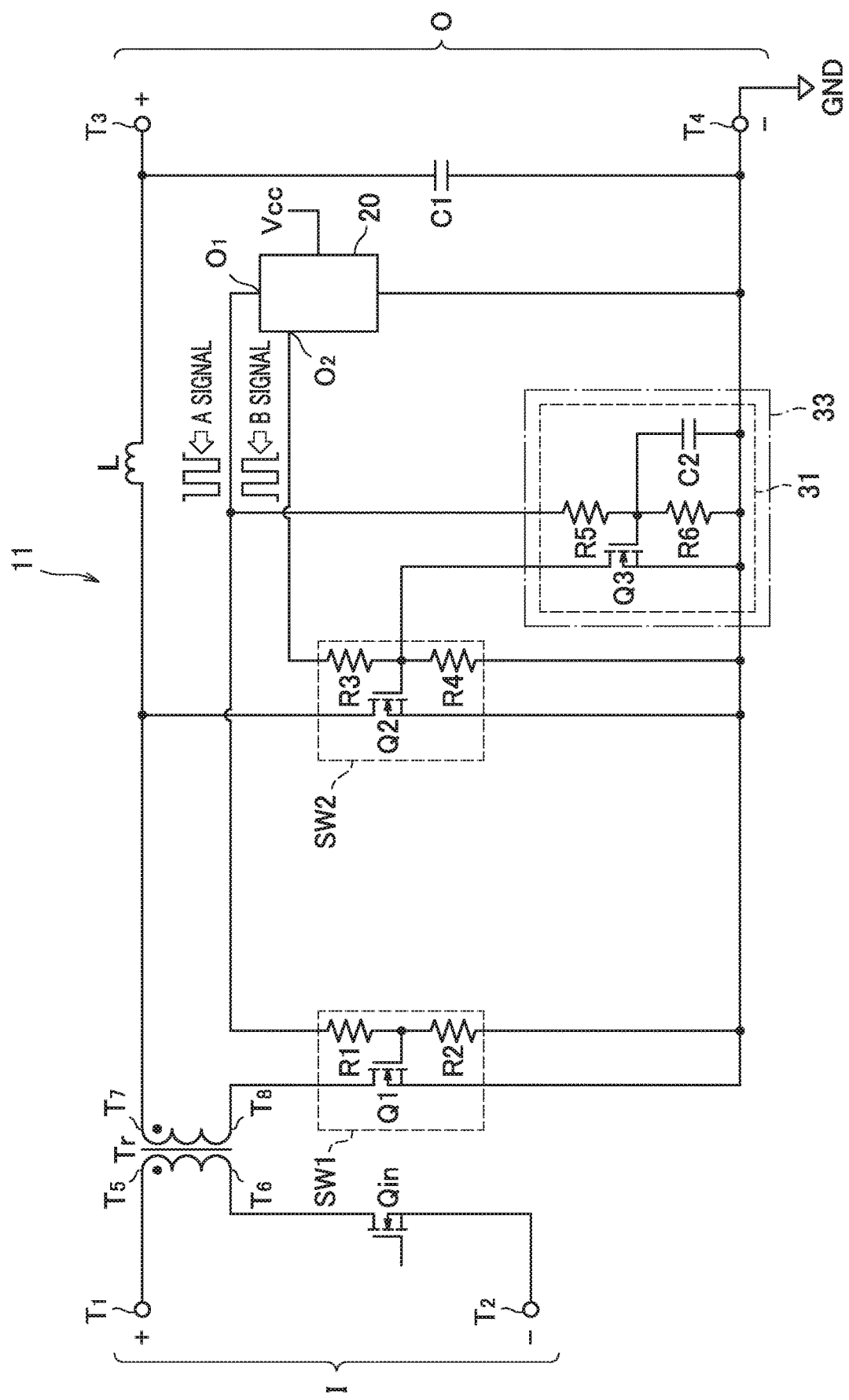
FIG. 6 is a circuit diagram illustrating an example of the switching power supply according to a modified example.

FIG. 6 is a circuit diagram illustrating an example of the switching power supply according to a modified example. As one example, FIG. 6 illustrates a circuit diagram in which a time until the second switching circuit SW2 is turned on is delayed. As illustrated in FIG. 6, a delay circuit 33 includes the first delay circuit 31. The first delay circuit 31 delays, based on the first control signal for turning on the first switching circuit SW1, the time until the second switching circuit SW2 is turned on. It is noted that detailed descriptions will be omitted with regard to the parts redundant with those in FIG. 2 described above.

Herein, states of the respective elements along with on and off of the first switching circuit SW1 and the second switching circuit SW2 in the present embodiment will be described with reference to a timing chart related to on and off of the first switching circuit SW1 and the second switching circuit SW2. It is noted that, in the present embodiment, a case where the first control signal and the second control signal are alternately input, and a case where the first control signal and the second control signal are discretely input will be separately described. In addition, in the following embodiment, redundant descriptions are omitted where appropriate.

(Case where the first Control Signal and the Second Control Signal are Alternately Input)

Figure 7:
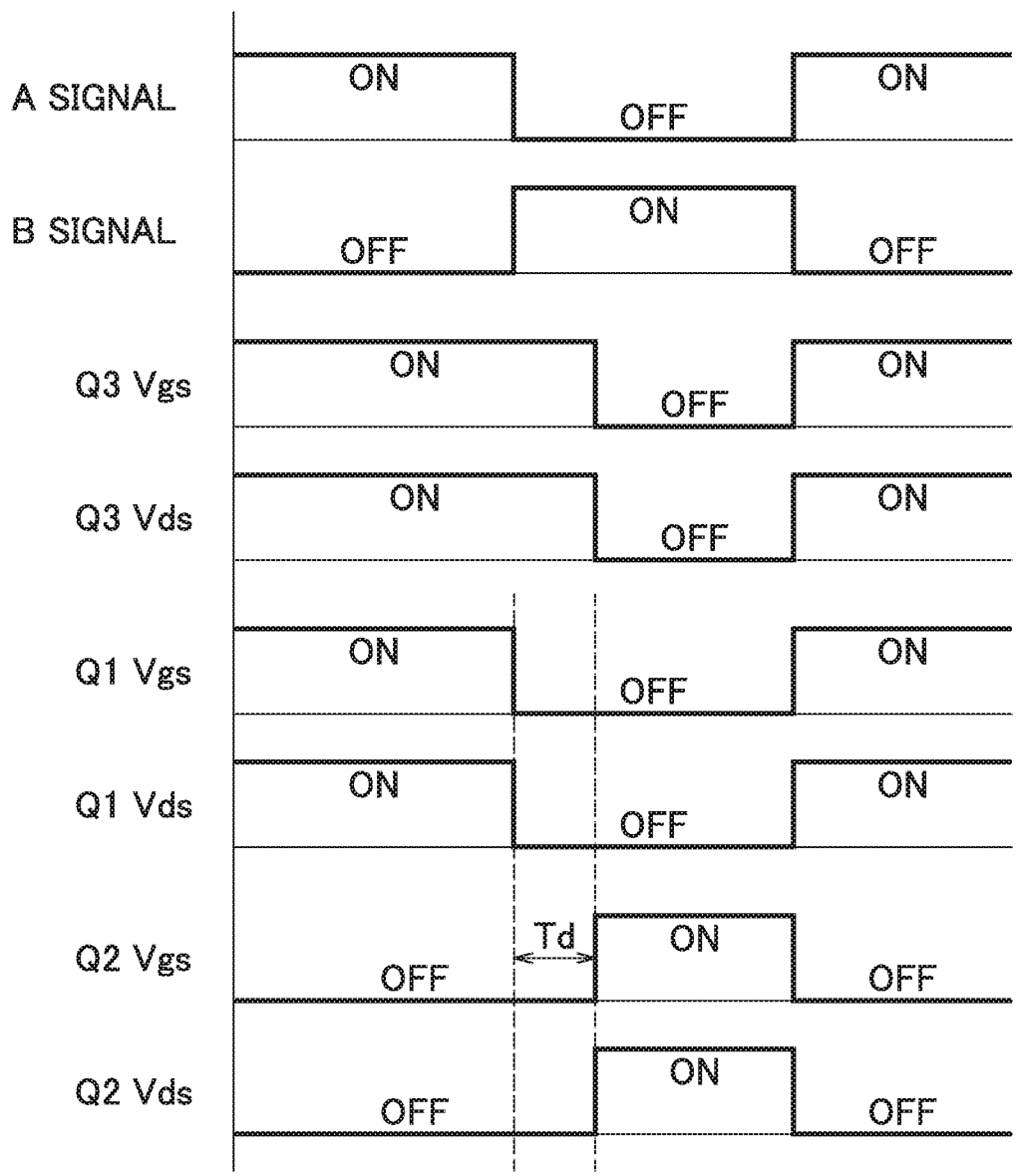
FIG. 7 is a timing chart in the modified example in a case where the first control signal and the second control signal are alternately input to the first switching circuit and the second switching circuit.

FIG. 7 is a timing chart in a case where the first control signal and the second control signal are alternately input to the first switching circuit SW1 and the second switching circuit SW2. The timing chart illustrated in FIG. 7 indicates the gate-source voltage Vgs and the drain-source voltage Vds in the third switching element Q3, the gate-source voltage Vgs and the drain-source voltage Vds in the first switching element Q1, and the gate-source voltage Vgs and the drain-source voltage Vds in the second switching element Q2 in a case where the first control signal for turning on the first switching circuit SW1 (A signal illustrated in FIG. 7) and the second control signal for turning on the second switching circuit SW2 (B signal illustrated in FIG. 7) are alternately input by the control circuit 20. That is, FIG. 7 illustrates the states of the respective elements included in the switching power supply in a case where the A signal and the B signal described above are alternately input.

(Period from when the A Signal is Turned on to a Moment Immediately Before the A Signal is Turned Off (First Period))

First, in a period from when the A signal illustrated in FIG. 7 is turned on to a moment immediately before the A signal is turned off, the first switching element Q1 is turned on. In addition, the second capacitance C2 accumulates charges. In addition, the third switching element Q3 is turned on.

(Period from when the A signal is Turned Off to a Moment Immediately Before the B Signal is Turned On (Second Period))

Next, in a period from when the A signal is turned off to a moment immediately before the B signal is turned on, the first switching element Q1 is turned off. In addition, the second capacitance C2 supplies the accumulated charges to the gate of the third switching element Q3. In addition, the third switching element Q3 is turned off later than the first switching element Q1. A reason for this is because the charges are supplied to the gate of the third switching element Q3 from the second capacitance C2.

(Period from when the B Signal is Turned on to a Moment Immediately Before the B Signal is Turned Off (Third Period))

Next, in a period from when the B signal is turned on to a moment immediately before the B signal is turned off, the second switching element Q2 remains off. A reason for this is because the third switching element Q3 is turned off later than the first switching element Q1. That is, since the third switching element Q3 is turned off later than the first switching element Q1, it is possible to delay the timing for turning on the second switching element Q2. As a result, it is possible to secure the time (dead time) Td when both the first switching element Q1 and the second switching element Q2 are turned off. After the elapse of the certain time, the third switching element Q3 is turned off, and then the second switching element Q2 is turned on.

(Period from when the B Signal is Turned Off to a Moment Immediately Before the A Signal is Turned On (Fourth Period))

Next, in a period from when the B signal is turned off to a moment immediately before the A signal is turned on, the second switching element Q2 is turned off.

Thereafter, in a case where the first control signal and the second control signal are alternately input, until the supply of the A signal and the B signal from the control circuit 20 is ended, the operations in the above-described first period to the fourth period are repeated.

(Case where the First Control Signal and the Second Control Signal are Discretely Input)

Figure 8:
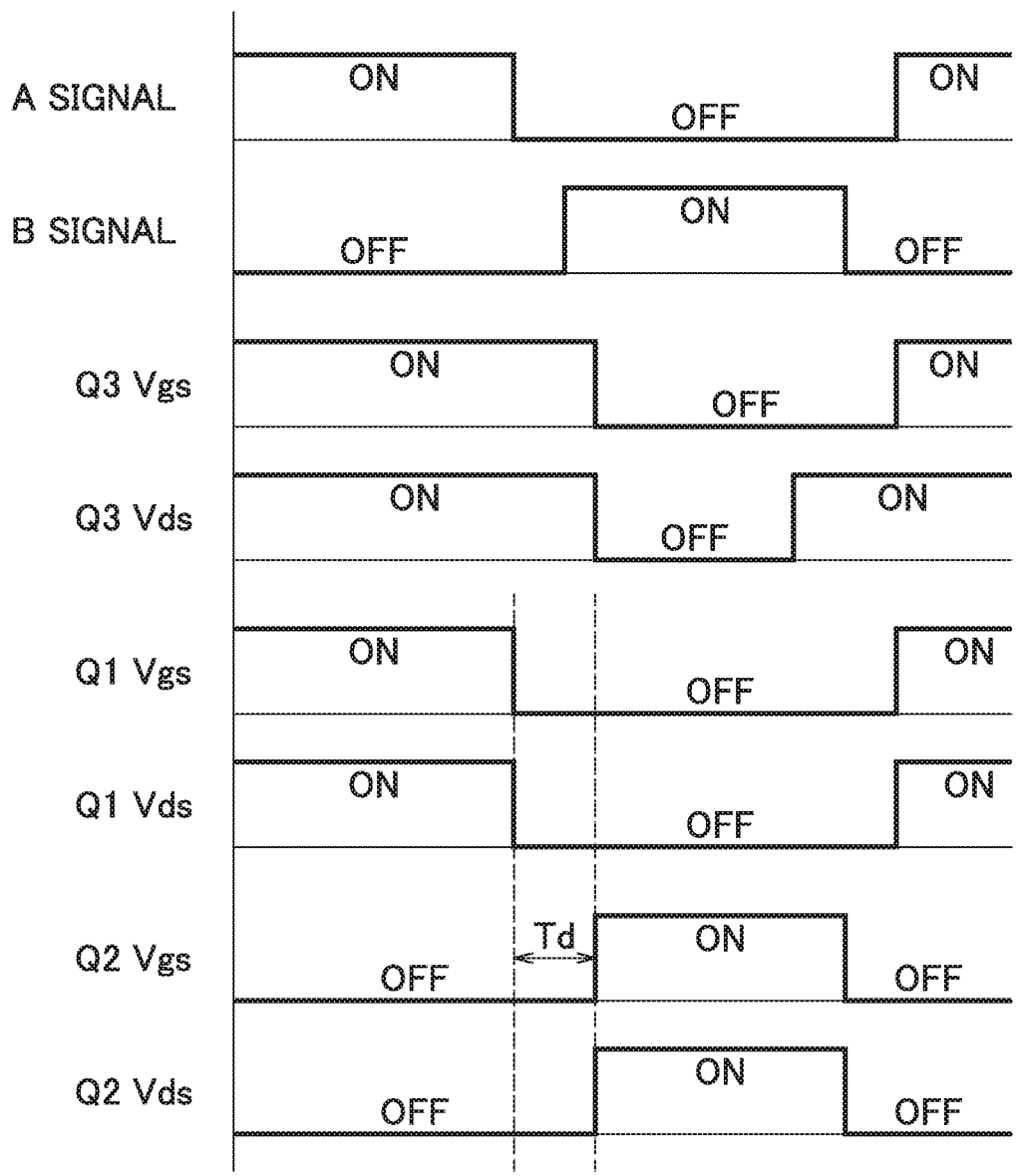
FIG. 8 is a timing chart in the modified example in a case where the first control signal and the second control signal are discretely input to the first switching circuit and the second switching circuit.

FIG. 8 is a timing chart in a case where the first control signal and the second control signal are discretely input to the first switching circuit SW1 and the second switching circuit SW2. The timing chart illustrated in FIG. 8 indicates the gate-source voltage Vgs and the drain-source voltage Vds in the third switching element Q3, the gate-source voltage Vgs and the drain-source voltage Vds in the first switching element Q1, and the gate-source voltage Vgs and the drain-source voltage Vds in the second switching element Q2 in a case where the first control signal for turning on the first switching circuit SW1 (A signal illustrated in FIG. 8) and the second control signal for turning on the second switching circuit SW2 (B signal illustrated in FIG. 8) are discretely input by the control circuit 20. That is, FIG. 8 illustrates the states of the respective elements included in the switching power supply in a case where the A signal and the B signal described above are discretely input.

(Period from when the A Signal is Turned on to a Moment Immediately Before the A Signal is Turned Off (First Period))

First, in a period from when the A signal illustrated in FIG. 8 is turned on to a moment immediately before the A signal is turned off, the first switching element Q1 is turned on. In addition, the second capacitance C2 accumulates charges. In addition, the third switching element Q3 is turned on.

(Period from when the A Signal is Turned Off to a Moment Immediately Before the B Signal is Turned On (Second Period))

Next, in a period from when the A signal is turned off to a moment immediately before the B signal is turned on, the first switching element Q1 is turned off. In addition, the second capacitance C2 supplies the accumulated charges to the gate of the third switching element Q3. In addition, the third switching element Q3 is turned off later than the first switching element Q1. A reason for this is because the charges are supplied to the gate of the third switching element Q3 from the second capacitance C2. After the elapse of the certain time, the third switching element Q3 is turned off.

(Period from when the B Signal is Turned on to a Moment Immediately Before the B Signal is Turned Off (Third Period))

Next, in a period from when the B signal is turned on to a moment immediately before the B signal is turned off, the second switching element Q2 remains off. A reason for this is because the third switching element Q3 is turned off later than the first switching element Q1. That is, since the third switching element Q3 is turned off later than the first switching element Q1, it is possible to delay the timing for turning on the second switching element Q2. As a result, it is possible to secure the time (dead time) Td when both the first switching element Q1 and the second switching element Q2 are turned off. After the elapse of the certain time, the third switching element Q3 is turned off, and then the second switching element Q2 is turned on.

(Period from when the B Signal is Turned Off to a Moment Immediately Before the A Signal is Turned On (Fourth Period))

Next, in a period from when the B signal is turned off to a moment immediately before the A signal is turned on, the second switching element Q2 is turned off.

Thereafter, in a case where the first control signal and the second control signal are discretely input, until the supply of the A signal and the B signal from the control circuit 20 is ended, the operations in the above-described first period to the fourth period are repeated.

In accordance with the above-described configuration, the switching power supply according to the present embodiment provides the dead time when both the first switching element Q1 and the second switching element Q2 are turned off, by the first delay circuit 31. Accordingly, it is possible to avoid the state where the first switching element Q1 and the second switching element Q2 are turned on at the same time. In addition, as described above, the dead time is secured even when the first control signal and the second control signal are input at various timings, and it is possible to avoid the state where the first switching element Q1 and the second switching element Q2 are turned on at the same time.

In addition, by adjusting the values of the fifth resistor R5, the sixth resistor R6, and the second capacitance C2 which are included in the first delay circuit 31, it is possible to adjust the dead time to the optimal time appropriate to the circuit. Accordingly, the switching power supply according to the present embodiment can improve the efficiency of step-up and step-down. In addition, even when the dedicated-use IC is not used, the operation similar to the dedicated-use IC can be performed by the general-use IC.

(Overview)

As described above, the switching power supply according to the present embodiment includes the input terminal I and the output terminal O, the voltage converter 10 that includes the first switching circuit SW1 configured to serve as a trigger for inputting the voltage from the input terminal I and the second switching circuit SW2 configured to serve as a trigger for outputting, after the input voltage is converted, the converted voltage from the output terminal O, the control circuit 20 configured to output a control signal for selectively sequentially driving the first switching circuit SW1 and the second switching circuit SW2, and the delay circuit configured to delay, based on the control signal for driving any one of the first switching circuit SW1 and the second switching circuit SW2, the subsequent driving timing of the other switching circuit that is not driven to provide the dead time when both the first switching circuit SW1 and the second switching circuit SW2 are turned off.

In accordance with the above-described configuration, the switching power supply according to the present embodiment provides the dead time when both the first switching element Q1 and the second switching element Q2 are turned off, by the delay circuit 30. Accordingly, it is possible to avoid the state where the first switching element Q1 and the second switching element Q2 are turned on at the same time. In addition, as described above, the dead time is secured even when the first control signal and the second control signal are input at various timings, and it is possible to avoid the state where the first switching element Q1 and the second switching element Q2 are turned on at the same time.

In addition, by adjusting the values of the fifth resistor R5, the sixth resistor R6, and the second capacitance C2 which are included in the first delay circuit 31 and the seventh resistor R7, the eighth resistor R8, and the third capacitance C3 which are included in the second delay circuit 32, it is possible to adjust the dead time to the optimal time appropriate to the circuit. Accordingly, the switching power supply according to the present embodiment can improve the efficiency of step-up and step-down. In addition, in the switching power supply according to the present embodiment, even when the dedicated-use IC is not used, the operation similar to the dedicated-use IC can be performed by the general-use IC.

Thus, the switching power supply according to the present embodiment can improve the efficiency of the step-up and step-down while the risks such as the circuit damage in the voltage step-up and step-down operations are reduced.

Herein, in the above-described embodiment, the insulation type step-down converter is illustrated as the voltage converter 10. However, the switching power supply according to the present embodiment is not limited to this. For example, the present embodiment can also be applied to a non-insulation type step-down converter, an insulation type step-up converter, a non-insulation type step-up converter, a non-insulation type bidirectional converter, or an insulation type bidirectional converter.

<First Mode of the Present Disclosure>

A switching power supply according to a first mode of the present disclosure includes an input terminal and an output terminal, a voltage converter including a first switching circuit configured to serve as a trigger for inputting a voltage from the input terminal and a second switching circuit configured to serve as a trigger for outputting, after the input voltage is converted, the converted voltage from the output terminal, a control circuit configured to output a control signal for selectively sequentially driving the first switching circuit and the second switching circuit, and a delay circuit configured to delay, based on the control signal for driving any one of the first switching circuit and the second switching circuit, a subsequent driving timing of the other switching circuit that is not driven to provide a dead time when both the first switching circuit and the second switching circuit are turned off.

In accordance with the above-described configuration, the switching power supply according to the first mode of the present disclosure provides the dead time when both the first switching circuit and the second switching circuit are turned off, by the delay circuit. Accordingly, it is possible to avoid the state where the first switching circuit and the second switching circuit are turned on at the same time. In addition, the dead time is secured even when the first control signal and the second control signal are input at various timings, and it is possible to avoid the state where the first switching circuit and the second switching circuit are turned on at the same time.

Thus, the switching power supply according to the first mode of the present disclosure can improve the efficiency of the step-up and step-down while the risks such as the circuit damage in the voltage step-up and step-down operations are reduced.

<Second Mode of the Present Disclosure>

A delay circuit in a switching power supply according to a second mode of the present disclosure includes, in the switching power supply according to the above-described first mode, a first resistor connected to a signal output terminal for outputting the control signal to the driven switching circuit in the control circuit, a second resistor connected in series to the first resistor, a capacitance connected in parallel to the second resistor, and a switching element having a gate connected between the first resistor and the second resistor and a drain connected to the other switching circuit that is not driven.

In accordance with the above-described configuration, the switching power supply according to the second mode of the present disclosure can adjust the dead time to the optimal time appropriate to the circuit by adjusting the values of the first resistor, the second resistor, and the capacitance which are included in the delay circuit. Accordingly, the switching power supply according to the second mode of the present disclosure can improve the efficiency of step-up and step-down.

Thus, the switching power supply according to the second mode of the present disclosure can improve the efficiency of the step-up and step-down while the risks such as the circuit damage in the voltage step-up and step-down operations are reduced.

EXPLANATION OF REFERENCE SIGNS

10 Voltage converter
20 Control circuit
30 Delay circuit
31 First delay circuit
32 Second delay circuit
33 Delay circuit
C1 First capacitance
C2 Second capacitance
C3 Third capacitance
I Input terminal
L Coil
O Output terminal
$O_1$ First signal output terminal
$O_2$ Second signal output terminal
Q1 First switching element
Q2 Second switching element
Q3 Third switching element
Q4 Fourth switching element
Qin Input side switching circuit
R1 First resistor
R2 Second resistor
R3 Third resistor
R4 Fourth resistor
R5 Fifth resistor
R6 Sixth resistor
R7 Seventh resistor
R8 Eighth resistor
SW1 First switching circuit SW2 Second switching circuit
Tr Transformer

What is claimed is:

1. A switching power supply comprising:
   an input terminal and an output terminal;
   a voltage converter including a first switching circuit configured to serve as a trigger for inputting an input voltage from the input terminal and a second switching circuit configured to serve as a trigger for outputting, after the input voltage is converted, the converted voltage from the output terminal;
   a control circuit configured to output control signals for selectively sequentially driving the first switching circuit and the second switching circuit; and
   a delay circuit configured to delay, based on a respective control signal driving a driven switching circuit that is one of the first switching circuit or the second switching circuit, a subsequent driving timing of the other switching circuit of the first switching circuit or the second switching circuit that is not driven, to provide a dead time when both the first switching circuit and the second switching circuit are turned off;
   wherein the delay circuit is configured to inhibit turning-on of the driven switching circuit for the dead time immediately after the respective control signal is initiated to drive the driven switching circuit; and
   wherein the delay circuit includes a first resistor connected to a signal output terminal for outputting the respective control signal to the driven switching circuit in the control circuit, a second resistor connected in series to the first resistor, a capacitance connected in parallel to the second resistor, and a switching element having a gate connected between the first resistor and the second resistor, and a drain connected to the other switching circuit that is not driven.

2. A switching power supply comprising:
   an input terminal and an output terminal;
   a voltage converter including a first switching circuit configured to serve as a trigger for inputting an input voltage from the input terminal and a second switching circuit configured to serve as a trigger for outputting, after the input voltage is converted, the converted voltage from the output terminal;
   a control circuit configured to output control signals for selectively sequentially driving the first switching circuit and the second switching circuit; and
   a delay circuit configured to delay, based on a respective control signal driving a driven switching circuit that is one of the first switching circuit or the second switching circuit, a subsequent driving timing of the other switching circuit of the first switching circuit or the second switching circuit that is not driven, to provide a dead time when both the first switching circuit and the second switching circuit are turned off;
   wherein the delay circuit includes a first resistor connected to a signal output terminal for outputting the respective control signal to the driven switching circuit in the control circuit, a second resistor connected in series to the first resistor, a capacitance connected in parallel to the second resistor, and a switching element having a gate connected between the first resistor and the second resistor, and a drain connected to the other switching circuit that is not driven.

* * * * *